(12) United States Patent
Paschal et al.

(10) Patent No.: US 11,775,002 B2
(45) Date of Patent: Oct. 3, 2023

(54) REDUNDANT CLOCK SWITCH

(71) Applicant: International Business Machines Corporation, Armonk, NY (US)

(72) Inventors: Matthew James Paschal, Rochester, MN (US); Daniel M. Dreps, Georgetown, TX (US); Glen A. Wiedemeier, Austin, TX (US); Bruce George Rudolph, Rochester, MN (US); James Strom, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 17/386,043

(22) Filed: Jul. 27, 2021

(65) Prior Publication Data
US 2023/0035405 A1 Feb. 2, 2023

(51) Int. Cl.
*G06F 1/08* (2006.01)
*G06F 1/12* (2006.01)

(52) U.S. Cl.
CPC . *G06F 1/08* (2013.01); *G06F 1/12* (2013.01)

(58) Field of Classification Search
CPC ..................................... G06F 1/12; G06F 1/08
See application file for complete search history.

(56) References Cited

U.S. PATENT DOCUMENTS

| | | | |
|---|---|---|---|
| 5,550,514 A | 8/1996 | Liedberg | |
| 5,574,753 A | 11/1996 | Vartti et al. | |
| 5,852,728 A * | 12/1998 | Matsuda | G06F 11/1604 714/2 |
| 6,675,307 B1 | 1/2004 | Heitkamp et al. | |
| 7,308,592 B2 | 12/2007 | Schmunkamp et al. | |
| 7,800,421 B2 | 9/2010 | Okuda et al. | |
| 10,514,720 B1 | 12/2019 | J et al. | |
| 10,712,770 B1 | 7/2020 | Chiang et al. | |
| 10,778,234 B2 * | 9/2020 | Li | H03L 7/099 |
| 11,152,947 B2 * | 10/2021 | Chu | H03L 7/18 |
| 2006/1641751 | 7/2006 | Daniel | |
| 2006/1848141 | 8/2006 | Dietmar | |
| 2006/1934171 | 8/2006 | Craig | |
| 2010/0172455 A1 * | 7/2010 | McShea | H03L 7/087 375/362 |

(Continued)

OTHER PUBLICATIONS

"Glitchless Oscillator Switch for High Reliability," Original Publication: IBM TDB n2 07-91 p. 55-58, PCOM000120984D; IP.com Electronic Publication Date: Apr. 2, 2005.

(Continued)

*Primary Examiner* — Phil K Nguyen
(74) *Attorney, Agent, or Firm* — Matthew Zehrer

(57) ABSTRACT

A first oscillator signal and a second oscillator signal are transmitted to a processing unit. The first oscillator signal has a finite frequency or phase offset relative to the second oscillator signal. A first clock signal that is derived from the first oscillator signal is selected as a primary clock to clock the processing unit. A second clock signal derived from the second oscillator signal is aligned to the first clock signal. If a fault is detected on the first clock signal, the second clock signal is selected as the primary clock to clock the processing unit. Upon being selected as the primary clock, the phase of the second is stretched by one fixed phase for one clock cycle.

19 Claims, 9 Drawing Sheets

(56) References Cited

U.S. PATENT DOCUMENTS

2015/0227162 A1* 8/2015 Zhu .................... H03K 5/14
331/49
2015/2271621 8/2015 Dan

OTHER PUBLICATIONS

"Integratable Loss of Oscillator Circuit for Use with Standby Sparing in Conjunction with Phase Locked Loop Buffering of System Oscillator," Original Publication: IBM TDB n4a 09-92 p. 406-409, IPCOM000109641D, IP.com Electronic Publication Date: Mar. 24, 2005.
U.S. Appl. No. 65/385,181, Chengson David.
International Search Report and Written Opinion for Application PCT/IB2022/056113, dated Oct. 9, 2022, 9 pages.

* cited by examiner

US 11,775,002 B2

REDUNDANT CLOCK SWITCH

BACKGROUND

Various embodiments of the present application generally relate to an electronic system that includes a processing unit, such as a processor, integrated circuit (IC), or the like and more specifically relates to a redundant clock switch within the processing unit that provides a reference clock signal.

SUMMARY

In an embodiment of the present invention, a redundant clock switch (RCS) clocking method is presented. The method includes deriving, with the RCS, a first clock signal from a first oscillator signal received by the RCS from a first oscillator. The method further includes deriving, with the RCS, a second clock signal from a second oscillator signal received by the RCS from a second oscillator. The second oscillator signal has a frequency or phase offset relative to the first oscillator signal. The method further includes selecting, with the RCS, the first clock signal as a reference clock output from the RCS. The method further includes aligning, with the RCS, the second clock signal to the first clock signal.

In another embodiment of the present invention, an electronic device is presented. The electronic device includes a first oscillator that generates a first oscillator signal and a second oscillator that generates a second oscillator signal. The second oscillator signal has a frequency or phase offset relative to the first oscillator signal. The electronic device further includes a redundant clock switch (RCS). The RCS includes a primary side communicatively connected to the first oscillator and a redundant side communicatively connected to the second oscillator. The RCS further includes a primary phase rotator within the primary side that derives a primary clock signal from the first oscillator signal. The RCS further includes a multiplexer that selects the primary clock signal as an output reference clock that clocks a processing unit. The RCS further includes a redundant phase rotator within the redundant side that derives a redundant clock signal from the second oscillator signal and aligns the redundant clock signal to the primary clock signal.

In yet another embodiment of the present invention, a redundant clock switch (RCS) is presented. The RCS includes a primary phase rotator, a primary shift register, and a first multiplexer. The primary phase rotator includes a primary oscillator signal input. The primary shift register shifts N copies of the primary oscillator signal input by a fixed number of degrees to create N copies of the primary oscillator signal input each separated by a fixed phase. The first multiplexer selects one of the N copies of the primary oscillator signal input that has a phase lagging that of the primary oscillator signal input by one fixed phase as the primary clock signal. The RCS further includes an output multiplexer that selects the primary clock signal as the reference clock output. The RCS further includes a redundant phase rotator, a redundant shift register, and second multiplexer. The redundant phase rotator includes a redundant oscillator signal input. The redundant shift register shifts N copies of the redundant oscillator signal input by the fixed number of degrees to create N copies of the redundant oscillator signal input each separated by the fixed phase. The second multiplexer selects one of the N copies redundant oscillator signal input that has a phase lagging that of the redundant oscillator signal input by one fixed phase as the redundant clock signal. The RCS further includes a redundant phase alignment loop that rotates the phase of the redundant clock signal to align with the phase of the primary clock signal.

In yet another embodiment, a method is presented. The method includes transmitting a first oscillator signal and second oscillator signal to a processing unit. The first oscillator signal has a finite frequency or phase offset relative to the second oscillator signal. The method includes powering the processing unit and selecting a first clock signal derived from the first oscillator signal as a primary clock to clock the processing unit. The method further includes aligning rising edges of a second clock signal derived from the second oscillator signal to rising edges of the first clock signal. The method further includes checking for a fault on the first clock signal and if a fault is detected on the first clock signal, selecting the second clock signal as the primary clock to clock the processing unit.

These and other embodiments, features, aspects, and advantages will become better understood with reference to the following description, appended claims, and accompanying drawings.

Figure 1:
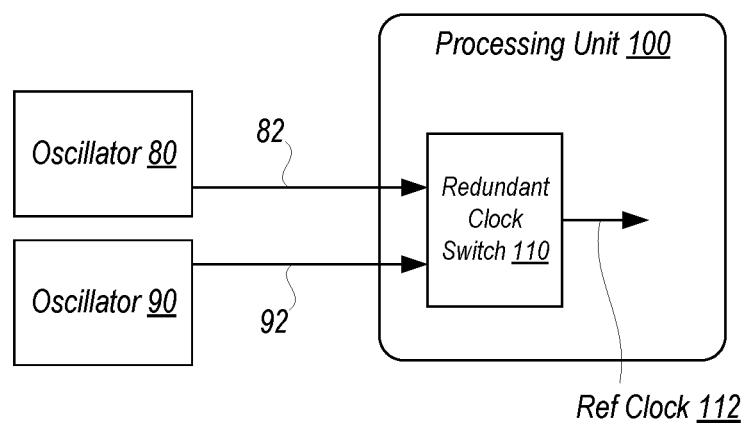
FIG. 1 is a block diagram illustrating a processing unit that includes a redundant clock switch, in accordance with one or more embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Computer processing units often obtain their clock source from an external crystal oscillator chip. Errors associated with the oscillator clock signal may impact reliability of the processing unit, itself, and/or a higher level computer system that utilizes the processing unit. Ultimately, this error could lead to the computer system to fail, could necessitate a reboot, or the like. Recovering from such down time adversities may be time consuming and may be costly if associated business operations are adversely affected. Therefore, a redundant clock switch (RCS) is provided. The RCS provides a reference clock output to the processing unit. Initially, the reference clock is generated from a first oscillator clock signal. If the RCS detects an error associated with the first oscillator clock signal, the RCS generates the reference clock output from a second redundant oscillator clock signal. As such, adversities due to an oscillator clock signal error may be reduced or avoided.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, circuits, or the like, have not been described in exhaustive detail so as not to unnecessarily obscure more pertinent aspects of the embodiments described herein.

FIG. 1 illustrates a processing unit 100 that includes RCS 110, in accordance with one or more embodiments. A first oscillator 80 and a second oscillator 90 are both communicatively connected to the RCS 110 of the processing unit 100. Oscillator 80 and oscillator 90 are discrete oscillators and may be external to the processing unit 100. The first oscillator 80 provides a first oscillator clock output signal 82 to RCS 110. Similarly, the second oscillator 90 provides a second oscillator clock output signal 92 to RCS 110.

Because oscillator 80 is a discrete or separate component relative to oscillator 90, the oscillator clock output signal 82 has a finite frequency or phase offset or difference relative to the oscillator clock output signal 92. Oscillator clock output signal 82 or oscillator clock output signal 92 is utilized by RCS 110 to generate a reference clock output 112. The clock output 112 may be utilized by the processing unit 100 to synchronize processing unit 100 circuit operations or functions.

Oscillator 80, 90 may be an electronic oscillator circuit that uses mechanical resonance of a vibrating crystal or piezoelectric material to create a constant frequency clock output signal 82, 92, respectively. More generically, oscillator 80, 90 may be clock generator that includes a resonant circuit and may optionally include an amplifier to produce the constant frequency clock output signal 82, 92.

Processing unit 100 may be a processor, central processing unit (CPU), graphic processing unit (GPU), processing die, microprocessor, integrated circuit (IC), or the like. Generally, processing unit 100 is an electrical circuit or electrical circuit system that utilizes a clock signal to synchronize circuit operations or functions.

Figure 2:
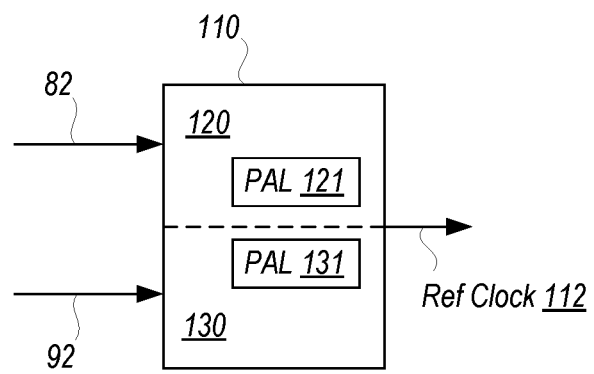
FIG. 2 is a block diagram illustrating redundant sides of a redundant clock switch, in accordance with one or more embodiments.

FIG. 2 is a block diagram illustrating a first side 120 and a second side 130 of RCS 110, in accordance with one or more embodiments. Oscillator 80 provides the clock output signal 82 for side 120 to derive the ref clock output 112. Similarly, oscillator 90 provides clock output signal 92 for side 130 to derive the ref clock output 112.

Initially, RCS 110 selects one of the clock signals 82, 92, from oscillators 80, 90 to derive the clock signal for the reference clock output 112. For example, RCS 110 may initially choose clock signal 82 to utilize for side 120 to derive the output reference clock 112. In this example, signal 82 and side 120 may be deemed the primary signal and the primary side, respectively, and the signal 92 and side 130 may be deemed the secondary signal and the secondary side, respectively. If RCS 110 determines there is an error within the side 120 or with clock output signal 82, the RCS 110 switches to and allows side 130 to utilize clock output signal 92 to derive the output the reference clock 112.

Since the clock signals 82, 92 come from different oscillators 80, 90, respectively, there are slight frequency and phase differences therebetween. To minimize phase jump when RCS 110 switches to the secondary signal, a phase alignment loop (PAL) within the secondary side aligns the rising edge of the derived secondary signal to the rising edge of the primary derived signal. For example, if side 130 is the secondary side, PAL 131 aligns the rising edge of the clock derived from the secondary signal 92 to the rising edge of the clock derived from the primary signal 82. Alternatively, if side 120 is the secondary side, PAL 121 aligns the rising edge of the clock derived from the secondary signal 82 to the rising edge of the clock derived from the primary signal 92.

Figure 3:
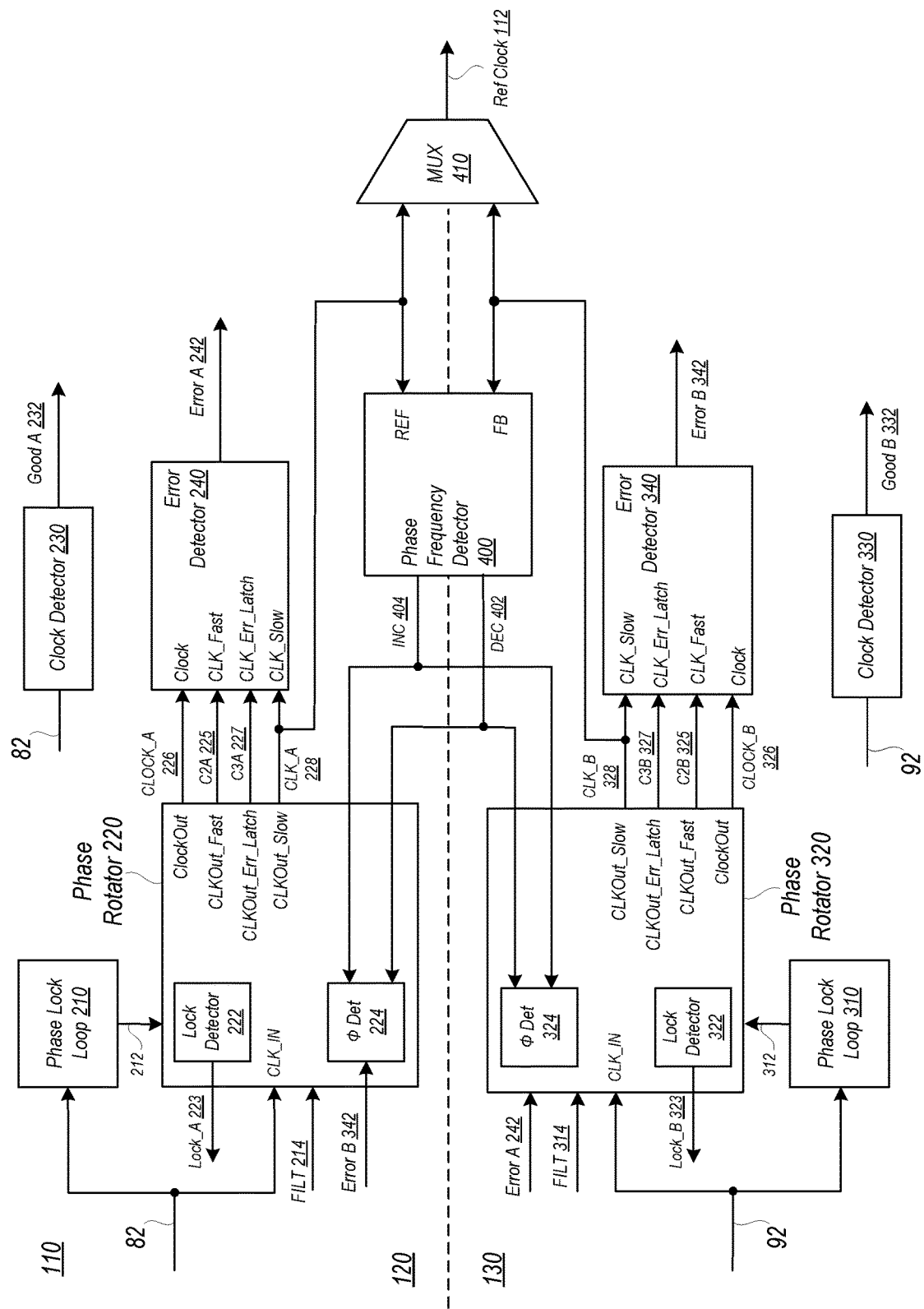
FIG. 3 is a block circuit diagram of a redundant clock switch, in accordance with one or more embodiments.

FIG. 3 is a block circuit diagram of RCS 110, in accordance with one or more embodiments.

Side 120 may include a phase lock loop 210, a phase rotator 220, a clock detector 230, and an error detector 240. Phase rotator 220 may include a lock detector 222 and a phase detector 224. PAL 121 may consist of phase frequency detector 400, phase rotator 220, and phase lock loop 210.

Side 130 may include a phase lock loop 310, a phase rotator 320, a clock detector 330, and an error detector 340. Phase rotator 320 may include a lock detector 322 and a phase detector 324. PAL 131 may consist of phase frequency detector 400, phase rotator 320, and phase lock loop 310.

Side 120 and side 130 may share phase frequency detector 400 and output multiplexer 410.

Both CLK_A signal 228 and CLK_B signal 328 are clocking signals derived from clock signal 82, 92, respectively. CLK_A signal 228 or CLK_B signal 328 may be deemed as the primary signal and may be outputted from output multiplexer 410 as reference clock signal 112 with the other signal serving as the secondary or redundant signal. The edges of CLK_A signal 228 and CLK_B signal 328 may be advantageously aligned. This edge alignment is generally accomplished by the secondary or redundant PAL 121, 131. For example, if side 120 is selected as the primary side, CLK_B signal 328 is advantageously aligned to the CLK_A signal 228, for glitchless switchover if/when error A signal 242 denotes a side 120 error.

The CLK_A signal 228 and CLK_B signal 328 may be further fed into phase frequency detector 400. Phase frequency detector 400 is a system that outputs pulses (i.e. increment (INC) pulse 404, decrement (DEC) pulse 402 whose widths are proportional to the phase difference between CLK_A signal 228 and CLK_B signal 328.

When the clock phase of the secondary clock falls behind or lags the primary clock phase, INC 404 pulses are generated. The widths of these INC 404 pulses are equal to the timing difference between the rising edges of the primary clock and secondary clock (i.e., CLK_A signal 228 and CLK_B signal 328, or vice versa). When the secondary clock phase is ahead of or leads the primary clock phase DEC pulses 402 are generated. The widths of these DEC 402 pulses equal the timing difference between the rising edges of the secondary clock and primary clock.

Figure 4A:
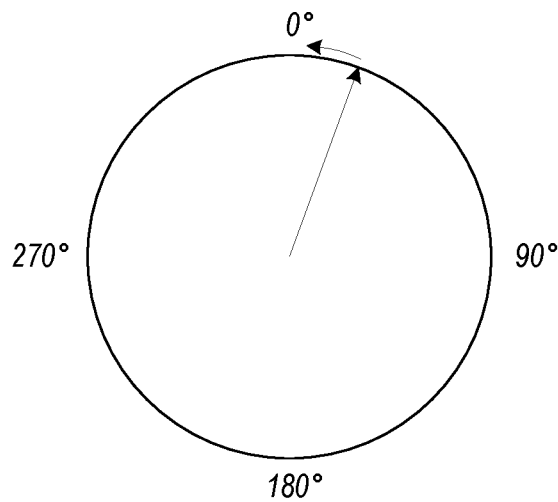
FIG. 4A and FIG. 4B is a phase circle diagram for aligning clk signals of the redundant sides, in accordance with one or more embodiments.
Figure 4B:
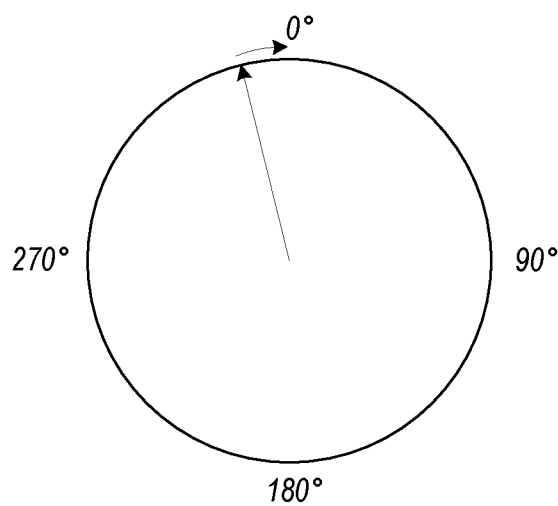

The INC pulse 404 and DEC pulse 402 may be fed into phase rotators 220, 320 to rotate the phase of the CLK_A 228 and CLK_B 328, respectively, around the phase circle shown in FIG. 4A and FIG. 4B, to effectively align the CLK_B 328 signal to the CLK_A 228 signal or the CLK_A 228 signal to the CLK_B 328 signal, depending which side 120 or 130 is selected as the primary. For example, if side 120 is the primary side and side 130 is the secondary side, the INC pulse 404 and DEC pulse 402 may be fed into the phase rotator 320 to rotate the phase of CLK_B signal 328 around the phase circle, effectively aligning the CLK_B signal 328 rising edge to the CLK_A signal 228 rising edge. Similarly, if side 130 is the primary side and side 120 is the secondary side, the INC pulse 404 and DEC pulse 402 may be fed into the phase rotator 220 to rotate the phase of CLK_A signal 228 around the phase circle, effectively aligning the CLK_A signal 228 rising edge to the CLK_B signal 328 rising edge.

Phase rotator 320 may move the phase of CLK_B signal 328 counter-clockwise around the phase circle, as shown in FIG. 4A, if the DEC pulse 402 is wider than the INC pulse 404 and may move the phase of CLK_B signal 328 clockwise around the phase circle, as shown FIG. 4B, if the INC pulse 404 is wider than the DEC pulse 402. Similarly, phase rotator 220 may move the phase of CLK_A signal 228 clockwise around the phase circle, as shown in FIG. 4B, if the DEC pulse 402 is wider than the INC pulse 404 and may move the phase of CLK_A signal 228 counter-clockwise around the phase circle, as shown FIG. 4A, if the INC pulse 404 is wider than the DEC pulse 402.

If or when an error occurs within side 120 (e.g., Error A signal 242 goes high) and side 120 is selected as the primary side, RCS 110 may switch from CLK_A signal 228 as being selected as the reference clock 112 from output multiplexer 410 to the redundant side 130 clock CLK_B signal 328 as being selected as the reference clock 112 from output multiplexer 410. Similarly, if or when an error occurs within side 130 (e.g., Error B signal 342 goes high) and side 130 is selected as the primary side, RCS 110 may switch from CLK_B signal 328 as being selected as the reference clock 112 from output multiplexer 410 to the redundant side 120 clock CLK_A signal 228 as being selected as the reference clock 112 from output multiplexer 410. This process of side 120 being the primary side and side 130 being the secondary to side 120 becoming the secondary side and side 130 becoming the primary side, or vice versa, may be referred herein as switchover.

To avoid pulse shrinkage upon the switchover of side 130 becoming the primary side, the ERROR_A signal 242 may be utilized by the phase rotator 320 to stretch, increase, or otherwise delay the phase of the CLK_B signal 328 relative to the phase of the CLK_A signal 228.

Similarly, upon a switchover of side 120 becoming the primary side, the ERROR_B signal 342 may be utilized by phase rotator 220 to stretch, increase, or otherwise delay the phase of the CLK_A signal 228 relative to the phase of the CLK_B signal 328.

For example, if side 120 is initially the primary side and if an error occurs within side 120, then ERROR_A signal 242 is used by phase rotator 320 to stretch or delay the phase of the CLK_B signal 328 (e.g., at switchover, the CLK_B signal 328 phase is stretched to equal a phase that is delayed from CLOCK_B signal 326 by one phase). Due to this phase delay, the ref clock 112 period may be effectively stretched by one phase for one cycle at switchover upon when side 130 becomes the primary side.

However, at switchover of side 130 becoming the primary side, it may not be beneficial to stretch the default CLK_B signal 328 if the default CLK_B signal 328 already has a positive phase or is delayed relative to the phase of the previously good CLK_A signal 228.

Alternatively, if side 130 is initially the primary side and if an error occurs within side 130, then ERROR_B signal 342 is used by phase rotator 220 to stretch or delay the phase of the CLK_A signal 228 (e.g., at switchover, the CLK_A signal 228 phase is stretched to equal a phase that is delayed from CLOCK_A signal 226 by one phase). Due to this phase delay, the ref clock 112 period may be effectively stretched by one phase for one cycle at switchover upon when side 120 becomes the primary side.

However, at switchover of side 120 becoming the primary side, it may not be beneficial to stretch this default CLK_A signal 228, if the default CLK_A signal 228 already has a positive phase or is delayed relative to the phase of the previously good CLK_B signal 328.

Phase lock loop (PLL) 210 is a system that generates an output clock signal with a phase related to the phase of input clock signal. In the present implementation, the output signal 212 has a phase that is related to the phase of input clock signal 82. PLL 210 may make the output signal 212 frequency a multiple of the incoming clock signal 82 frequency. For example, PLL 210 may effectively multiply the incoming clock signal 82 frequency (f) by a factor (N) to create a "f×N" output signal 212. In a particular implementation, the incoming frequency of clock signal 82 is 100 MHz and PLL 210 multiplies this frequency by 64 to create a 6.4 GHz 212 output signal.

Phase rotator 220 is a system that accepts the output signal 212 from PLL 210 and may perform a simultaneous shift of the signal 82 by a fixed number of degrees to create (N) internal copies of the signal 82 all separated by a fixed phase. For example, with PLL output 212 running at 6.4 GHz and signal 82 running at 100 MHz, phase rotator 220 creates 64 copies of the 100 MHz clock signal 82 with each copy being separated by 1/6.4 GHz or 156.25 ps. The phase rotator 220 may utilize or sample these copies to generate various clock signal output(s). For example, phase rotator 220 generates a CLOCK_A signal 226 output, the CLK_A signal 228 output, a C2A signal 225 output, and a C3A signal 227 output.

The CLOCK_A signal 226 may have a same, most similar, aligned, etc. phase relative to the phase of clock signal 82. The CLK_A signal 228 may have a phase that is lagging, slow, or delayed by one phase relative to the phase of clock signal 82 or the CLOCK_A signal 226. The C2A signal 225 may have a phase that is leading, fast, or early by one phase relative to the phase of clock signal 82 or the CLOCK_A signal 226. The C3A signal 227 is a clock signal that may be used by error detector 240 to retime its Error A 242 output to a known phase relative to the phase of the CLK_A 228 signal. The particular phase of C3A signal 227 relative to CLK_A signal 228 may be chosen to ensure that when an error is detected on side 120 that the switchover occurs at a controlled time relative to the rising edges of CLK_A signal 228 and CLK_B signal 328.

Phase rotator 220 may further include the phase detector 224 and a lock detector 222. Lock detector 222 is a system utilized when side 120 is the secondary side and may ensure the PAL 121 is locked (e.g., phase rotator 220 has rotated the phase of the secondary CLK_A signal 228 to the phase of the primary CLK_B signal 328) and that the CLK_A signal 228 is ready to be switched to if an error is detected within side 130. The lock detector 222 may generate an output Lock_A 223 signal that is true upon when the redundant side PAL 121 has rotated the phase of CLK_A signal 228 to the phase of the primary side 130 CLK_B signal 328.

Phase detector 224 is a system utilized when side 120 is the secondary side that may ensure signal 212, and those derived or generated therefrom, are stretched, or delayed, only upon a switchover event. When side 120 is the secondary side, phase detector 224 may determine whether CLK_A signal 228 leads or lags CLK_B signal 328. If phase detector 224 determines that CLK_A signal 228 leads CLK_B signal 328, then phase rotator 220 may delay the phase of CLK_A signal 228 by one phase to ensure that when MUX 410 switches from CLK_B signal 328 to CLK_A signal 228 that CLK_A signal 228 lags CLK_B signal 328. If phase detector 224 determines that CLK_A signal 228 lags CLK_B signal 328, then the phase of CLK_A signal 228 need not be further delayed by phase rotator 220, prior to a switchover event.

An external control FILT input signal 214 may be fed into phase rotator 220. FILT input signal 214 may specify a predetermined counter limit. The counter limit may be utilized to reset an up/down counter within the phase rotator 220 to a "0" state when the up/down counter reaches the counter limit specified by FILT input signal 214.

Clock detector 230 is a system utilized in power up or initialization sequences of processing unit 100 to determine whether side 120 has switching clocks. The clock detector 230 may sample input signal 82 and may generate an output Good_A signal 232 that is true upon when clocking (e.g. rising and falling edges) have been detected. The sampling interval may be pre-programed into clock detector 230. Alternatively, a sampling input to clock detector 230 may specify the predetermined sampling interval. During the power up processes, processing unit 100 may not initially have power. Therefore, a controller (not shown), discrete from processing unit 110, may be used to provide the sampling interval input and/or to monitor the logic state of the input signal 82.

Error detector 240 is a system that may sample one or more of the clock output signals (e.g., CLOCK_A signal 226, CLK_A signal 228, C2A signal 225, etc.) from phase rotator 220 and may check for stuck signal faults (e.g., the one or more sampled clock signals are stuck low or stuck high) and may output a true Error_A 242 signal upon fault detection.

Phase lock loop (PLL) 310 is a system that generates an output clock signal with a phase related to the phase of input clock signal. In the present implementation, the output signal 312 has a phase that is related to the phase of input clock signal 92. PLL 310 may make the output signal 312 frequency a multiple of the incoming clock signal 92 frequency. For example, PLL 310 may effectively multiply the incoming clock signal 92 frequency (f) by a factor (N) to create a "fxN" output signal 312. In a particular implementation, the incoming frequency of clock signal 92 is 100 MHz and PLL 310 multiplies this frequency by 64 to create a 6.4 GHz 312 output signal.

Phase rotator 320 is a system that accepts the output signal 312 from PLL 310 and may perform a simultaneous shift of the signal 92 by a fixed number of degrees to create (N) internal copies of the signal 92 all separated by a fixed phase. For example, with PLL output 312 running at 6.4 GHz and signal 92 running at 100 MHz, phase rotator 320 creates 64 copies of the 100 MHz clock signal 92 with each copy being separated by 1/6.4 GHz or 156.25 ps. The phase rotator 320 may utilize or sample these copies to generate various clock signal output(s). For example, phase rotator 320 generates a CLOCK_B signal 326 output, the CLK_B signal 328 output, a C2B signal 325 output, and a C3B signal 327 output.

The CLOCK_B signal 326 may have a same, most similar, aligned, etc. phase relative to the phase of clock signal 92. The CLK_B signal 328 may have a phase that is lagging, slow, or delayed by one phase relative to the phase of clock signal 92 or the CLOCK_B signal 326. The C2B signal 325 may have a phase that is leading, fast, or early by one phase relative to the phase of clock signal 92 or the CLOCK_B signal 326. The C3B signal 327 is a clock signal that may be used by error detector 340 to retime its Error B 342 output to a known phase relative to the phase of the CLK_B 328 signal. The particular phase of C3B signal 327 relative to CLK_B signal 328 may be chosen to ensure that when an error is detected on side 130 that the switchover occurs at a controlled time relative to the rising edges of CLK_B signal 328 and CLK_A signal 228.

Phase rotator 320 may further include the phase detector 324 and a lock detector 322. Lock detector 322 is a system utilized when side 130 is the secondary side and may ensure the PAL 131 is locked (e.g., phase rotator 320 has rotated the phase of the secondary CLK_B signal 328 to the phase of the primary CLK_A signal 228) and that the CLK_B signal 328 is ready to be switched to if an error is detected within side 120. The lock detector 322 may generate an output Lock_B 323 signal that is true upon when the redundant side PAL 131 has rotated the phase of CLK_B signal 328 to the phase of the primary side 120 CLK_A signal 228.

Phase detector 324 is a system utilized when side 130 is the secondary side that may ensure signal 312, and those derived or generated therefrom, are stretched, or delayed, only upon a switchover event. When side 130 is the secondary side, phase detector 324 may determine whether CLK_B signal 328 leads or lags CLK_A signal 228. If phase detector 324 determines that CLK_B signal 328 leads CLK_A signal 228, then phase rotator 320 may delay the phase of CLK_B signal 328 by one phase to ensure that when MUX 410 switches from CLK_A signal 228 to CLK_B signal 328, that CLK_B signal 328 lags CLK_A signal 228. If phase detector 324 determines that CLK_B signal 328 lags CLK_A signal 228 then the phase of CLK_B signal 328 need not be further delayed by phase rotator 320, prior to a switchover event.

An external control FILT input signal 314 may be fed into phase rotator 320. FILT input signal 314 may specify a predetermined counter limit. The counter limit may be utilized to reset an up/down counter within the phase rotator 220 to a "0" state when the up/down counter reaches the counter limit specified by FILT input signal 314.

Clock detector 330 is a system utilized in power up or initialization sequences of processing unit 100 to determine whether side 130 has switching clocks. The clock detector 330 may sample input signal 92 and may generate an output Good_B signal 332 that is true upon when clocking (e.g. rising and falling edges) have been detected. The sampling interval may be pre-programed into clock detector 330. Alternatively, a sampling input to clock detector 330 may specify the predetermined sampling interval. During the power up processes, processing unit 100 may not initially have power. Therefore, a controller (not shown), discrete from processing unit 110, may be used to provide the sampling interval input and/or to monitor the logic state of the input signal 92.

Error detector 340 is a system that may sample one or more of the clock output signals (e.g., CLOCK_B signal 326, CLK_B signal 328, C2B signal 325, etc.) from phase rotator 320 and may check for stuck signal faults (e.g., the one or more sampled clock signals are stuck low or stuck high) and may output a true Error_B 342 signal upon fault detection.

Figure 5:
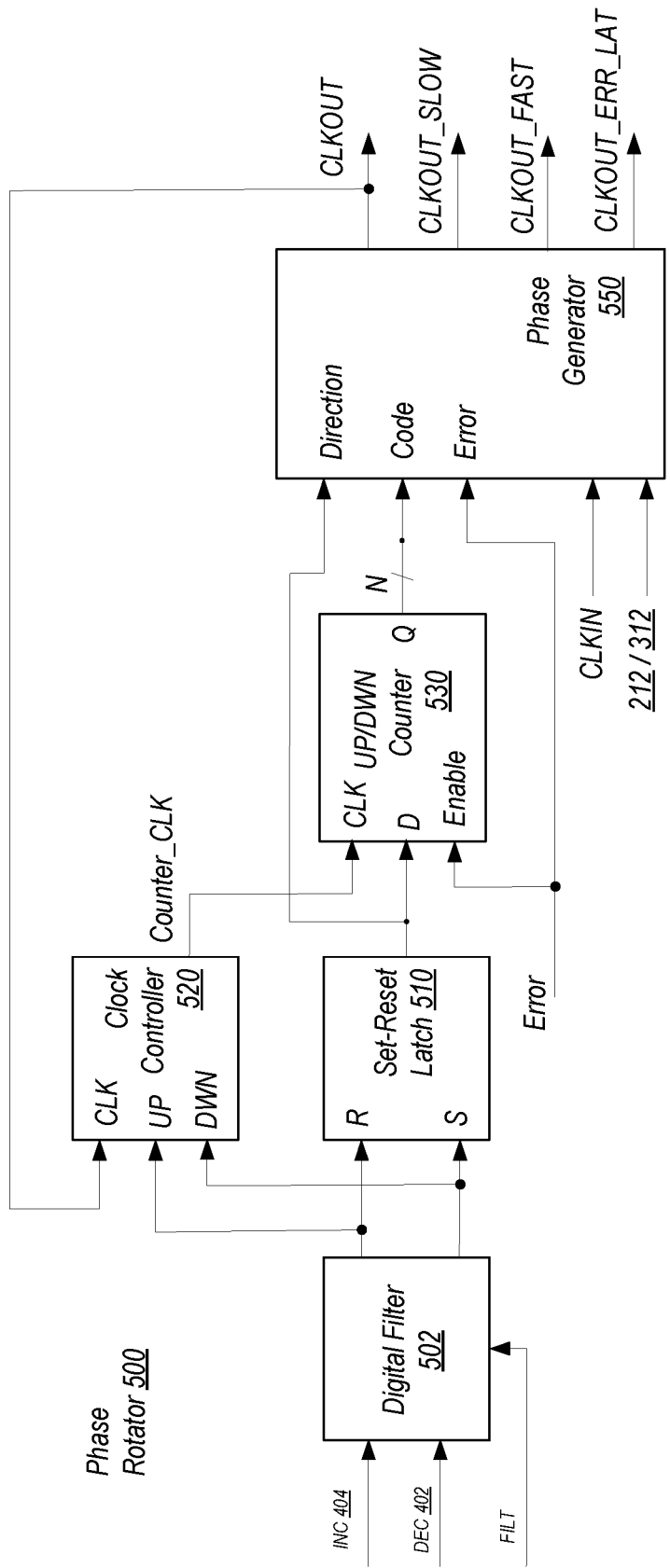
FIG. 5 is a block circuit diagram of an exemplary phase rotator of the redundant clock switch, in accordance with one or more embodiments.

Referring to FIG. 5 which depicts a block circuit diagram of an exemplary phase rotator 500, in accordance with one or more embodiments. Phase rotator 500 may be phase rotator 220 and/or phase rotator 320 depending upon the location (i.e., side 120 or side 130) in which rotator 500 is implemented within the RCS 110.

Phase rotator 500 may include a digital filter 502, a set-reset latch 510, a clock controller 520, an UP/DOWN counter 530, and/or a phase generator 550.

Digital filter 502 is a system that may filter INC signal 404 and the DEC signal 402. The INC signal 404 and the DEC signal 402 may be filtered to prevent the phase rotator 500 from responding to jitter on the INC signal 404 and/or the DEC signal 402.

The filtered INC signal 404 and the filtered DEC signal 402 may be connected to set-reset latch 510. Set-reset latch 510 may be a system that controls a count direction of UP/DOWN counter 530. The UP/DOWN counter 530 may output a N bit binary output code word to phase generator 550. Phase generator 550 may use the N bit binary code word from UP/DOWN counter 530 to move the phase of one or more of its outputs clockwise or counterclockwise around the phase circles shown in FIG. 4A, 4B, as appropriate, in response to the INC signal 404 and the DEC signal 402, as described above.

UP/DOWN counter 530 may change the count direction utilizing the DIRECTION D signal from the set-reset latch 510. Direction control circuits within UP/DOWN counter 530 may not respond instantaneously to the DIRECTION signal. Therefore, UP/DOWN counter 530 may be clocked by Counter_CLK after these direction control circuits have settled to their final values. Clock controller 520 may ensure that the Counter_CLK to UP/DOWN counter 530 is sufficiently or adequately delayed allowing the direction control circuits within UP/DOWN counter 530 to settle to their final values.

Figure 6:
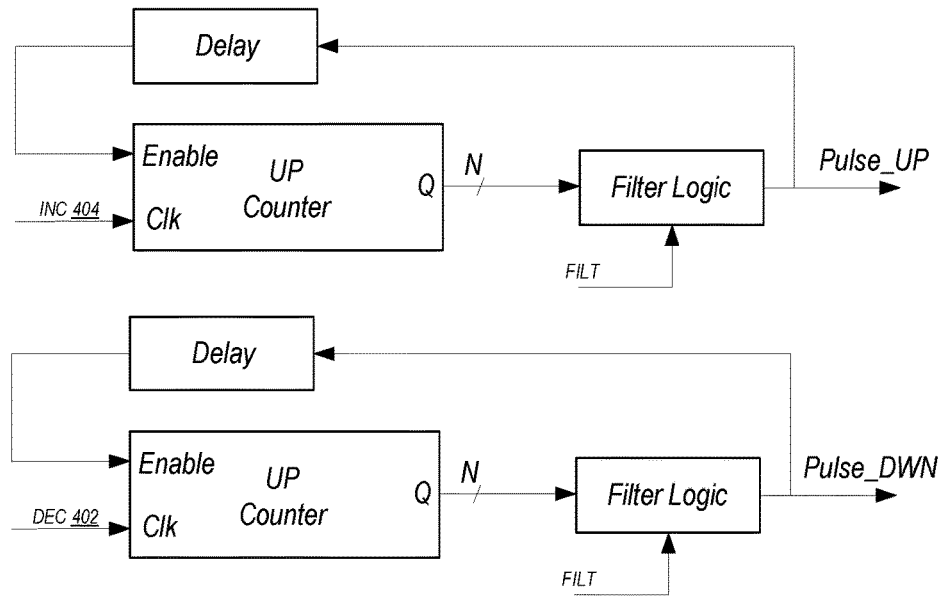
FIG. 6 is a block circuit diagram of an exemplary digital filter of the phase rotator, in accordance with one or more embodiments.

FIG. 6 depicts a block circuit diagram of an exemplary digital filter 502 of phase rotator 500, in accordance with one or more embodiments.

Digital filter 502 may include a pulse up filter loop and pulse down filter loop. Each filter loop may include an up counter, filter logic, and a delay. INC signal 404 may connect to the up filter loop. DEC signal 402 may connect to the pulse down filtered loop.

Digital filter 502 may count the number of consecutive INC or DEC signals before pulsing its PULSE_UP or PULSE_DWN outputs, respectively. Each up counter may be resettable with a feedback delay that resets the respective up counter to a "0" state when the up counter reaches its limit set by the external control FILT input. Digital filter 502 may create a filtered Pulse_Up output and filtered Pulse_DWN output that both connect to Set-Reset latch 510, and that may connect to an UP input, DWN input of clock controller 520, respectively.

FILT signal 214 may specify the up counter limit if phase rotator 500 is phase rotator 220 and is located within side 120. Similarly, FILT signal 314 may specify the up counter limit if phase rotator 500 is phase rotator 320 and is located within side 130.

Figure 7:
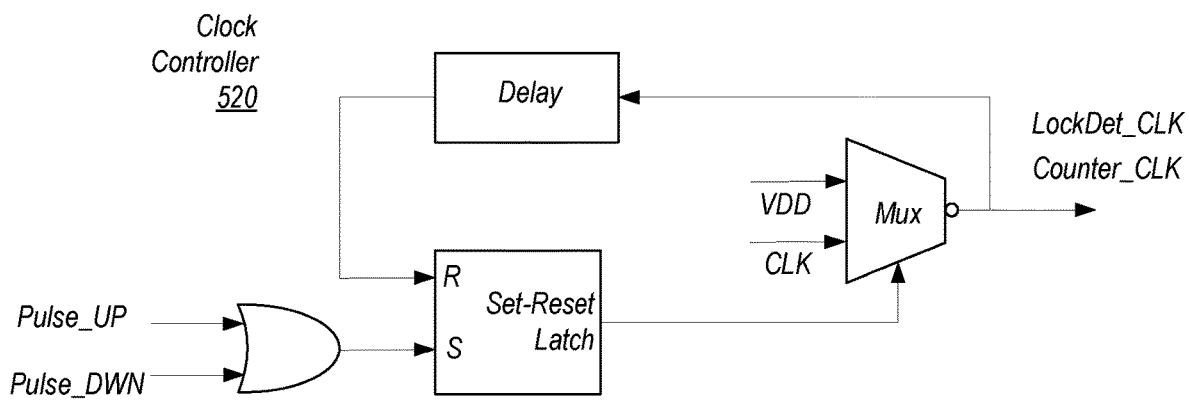
FIG. 7 is a block circuit diagram of an exemplary clock controller of the phase rotator, in accordance with one or more embodiments.

FIG. 7 depicts a block circuit diagram of an exemplary clock controller 520 of phase rotator 500, in accordance with one or more embodiments.

Clock controller 520 may include an OR gate, a set-reset latch, an output two-way multiplexer, and a delay. Clock controller 520 may utilize the pulses out of digital filter 502 as inputs to the OR gate to set the set-reset latch. The set-reset latch may switch the output two-way multiplexer from VDD to the input clock CLK (i.e., CLK_A signal 228 or CLK_B signal 328, respectively). The switch to the input clock CLK may occur after its rising edge, which allows the falling edge to pass through the two-way multiplexer.

The Counter_CLK output of the two-way multiplexer may connect back as the reset input of the set-reset latch reset through a delay bock, which then switches the two-way multiplexer output back to VDD. The Counter_CLK output may also be used to clock the UP/DWN counter 530. The Counter_CLK output may be adequately delayed for the UP/DWN counter 530 internal direction control circuits to settle.

Figure 8:
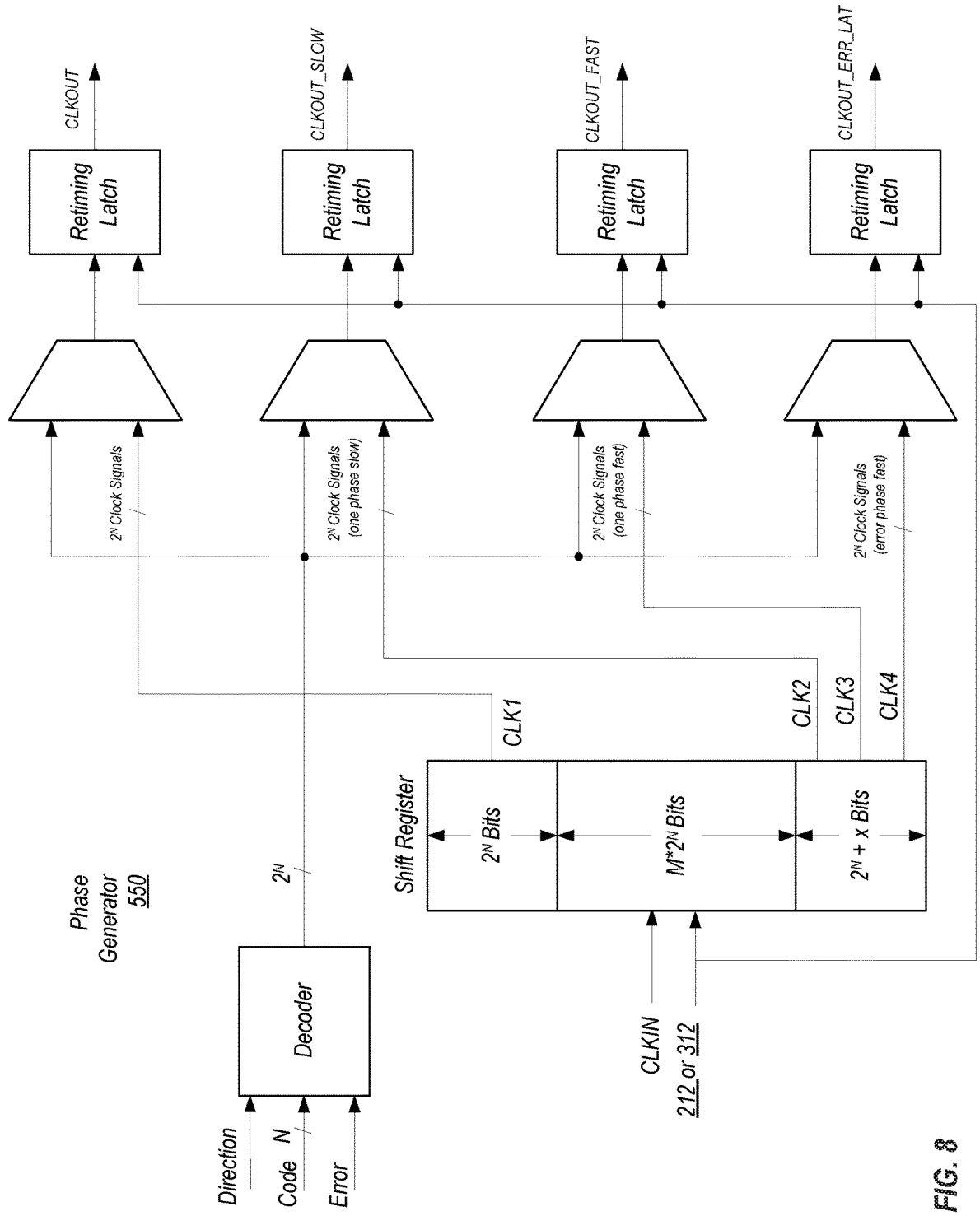
FIG. 8 is a block circuit diagram of an exemplary phase generator of the phase rotator, in accordance with one or more embodiments.

FIG. 8 is a block circuit diagram of an exemplary phase generator 550 of the phase rotator 500, in accordance with one or more embodiments. Phase generator 550 may include a decoder, a shift register, a plurality of $2^N$ way multiplexers, and a plurality of retiming latches.

The shift register may be $((M+2)*2^N)+x$ bits, where the number (M) is an integer greater than or equal to 0 and where the number (x) is $2^N/2<=x<=2^N$.

M cycles of signal 82 or signal 92, respectively, may be stored in and shifted by one phase by the shift register. This may provide a continuous running CLK_A signal 228 or CLK_B signal 328 derived therefrom, respectively, for at least M+1 cycles.

The shift register accepts signal 212, 312 from the appropriate PLL and the CLKIN from the oscillator (i.e. signal 82, 92). The shift register then creates $((M+2)*2^N)+x$ copies of signals 82 and 92 each separated by the period of the signals 212 and 312 (e.g., 156.25 ps when the PLL 210, 310 are set to multiply by 64).

The shift register may output CLK1, CLK2, CLK3, and CLK4. The outputs CLK1, CLK2, CLK3, and CLK4 may be N bit wide vectors. Using the CLK1 vector as the reference, CLK2 is delayed from CLK1 by M cycles of CLKIN minus $\frac{1}{2}^N$ bits. CLK3 is delayed from CLK1 by M cycles of CLKIN plus $\frac{1}{2}^N$ bits. CLK4 is delayed from CLK3 by x bits. One bit of each of these vectors is selected by the $2^N$ way multiplexers and retimed by the retiming latches. The outputs of the retiming latches may subsequently be used by the error detector 240, 340, respectively to detect clock errors.

The decoder may convert the input N bit code word from UP/DWN counter 530 to a $2^N$ bit one-hot code. The one-hot code may be used by the phase generator 550 to select the appropriate CLK1, CLK2, CLK3, or CLK4 that has the phase that aligns with the input clock CLKIN (i.e, signal 82, 92, respectively), using the associated $2^N$ way multiplexer, as CLKOUT (i.e., CLOCK_A signal 226 or CLOCK_B signal 326, respectively).

Phase generator 550 may similarly select the appropriate CLK1, CLK2, CLK3, or CLK4 that has the phase that is one phase slow compared to the input clock CLKIN (i.e, signal 82, 92, respectively), using the associated $2^N$ way multiplexer, as CLKOUT_SLOW (i.e., CLK_A signal 228 or CLK_B signal 328, respectively).

Phase generator 550 may also further select the appropriate CLK1, CLK2, CLK3, or CLK4 that has the phase that is one phase fast compared to the input clock CLKIN (i.e, signal 82, 92, respectively), using the associated $2^N$ way multiplexer, as CLOCKOUT_FAST (i.e., C2A signal 225 or C2B signal 325, respectively).

Phase generator 550 may also further select the appropriate CLK1, CLK2, CLK3, or CLK4 that has the phase that is multiple error phases slow compared to the input clock CLKIN (i.e, signal 82, 92, respectively), using the associated $2^N$ way multiplexer, as CLOCKOUT_ERR_LAT (i.e., C3A signal 227 or C3B signal 327, respectively).

Depending on the value of N, the $2^N$ way multiplexers could introduce a delay relative to the (f)(N) frequency.

Therefore, CLK1, CLK2, CLK3, and/or CLK4 may be retimed with a respective retiming latch before exiting phase generator 550.

Figure 9:
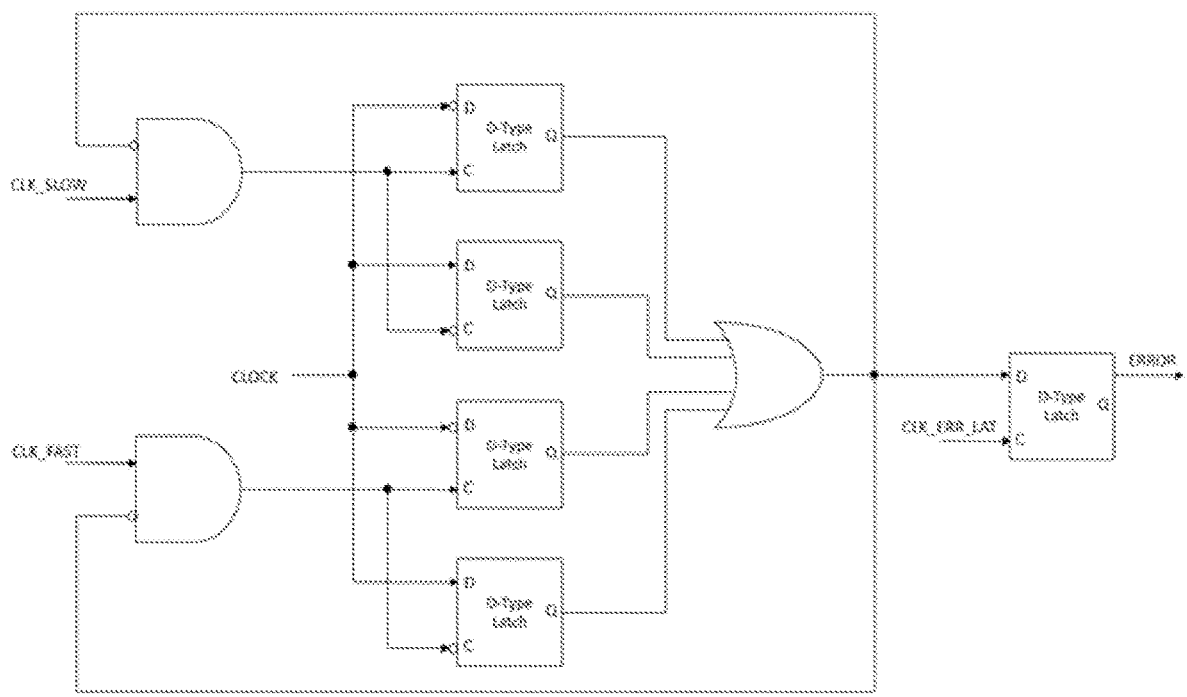
FIG. 9 is a block circuit diagram of an exemplary error detector of the redundant clock switch, in accordance with one or more embodiments.

The outputs of phase generator 550 (i.e., CLKOUT, CLKOUT_SLOW, CLKOUT_FAST, and CLKOUT_ERR_LAT) may be utilized by error detector 590, shown for example in FIG. 9, to monitor for clocking errors. If an error is detected on the primary side, then the ERROR input to the secondary side phase generator 550 decoder goes high which may cause that decoder's one-hot output code to advance one code. This code advancement may shift the phases of the CLK1-CLK4 outputs to their respective next lagging phase, thereby stretching the REFCLK output 112 by one phase for one cycle upon switchover.

Phase increases of CLK_B signal 328, upon switchover of side 130 becoming the primary side, may not be beneficial if the CLK_B signal 328 already has a positive phase relative to CLK_A signal 228. Similarly, phase increases of CLK_A signal 228, upon the switchover of side 120 becoming the primary side, may not be beneficial if the CLK_A signal 228 already has a positive phase relative to CLK_B signal 328. Therefore, the decoder of phase generator 550 of the secondary side need not advance the one-hot output code because the secondary CLKOUT_SLOW is already lagging the primary CLKOUT_Slow. The DIRECTION input to the decoder may be utilized to specify when such code advancement is not advantageous when the ERROR input (Error_A 242 or Error_B 342, respectively) flips to true.

FIG. 9 is a block circuit diagram of error detector 590, in accordance with one or more embodiments. Error detector 590 may be error detector 240 or error detector 340, respectively depending on which side 120, 130 error detector 590 is located within RCS 110. Error detector 590 may include input AND gates, a plurality of latches, an OR gate, and an output latch. Error detector 590 checks for stuck faults upon the CLKOUT output signal from phase rotator 500 and raises its ERROR (e.g., Error A 242 or Error B 342) output if detected.

Error Detector 590 may sample the CLKOUT signal from phase rotator 500 (i.e., CLOCK_A signal 226 or CLOCK_B signal 326, respectively) with the CLKOUT_SLOW signal from phase rotator 500 (i.e. CLK_A signal 228 or CLK_B signal 328, respectively) and with the CLKOUT_FAST signal from phase rotator 500 (i.e. C2A signal 225 or C2B signal 325, respectively).

The combination of the top AND gate and the top two D-Type Latches may check for stuck fault errors after the edges of the CLOCK input signal. The combination of the bottom AND gate and the bottom two D-Type Latches may further check for stuck fault errors prior to the edges of the CLOCK input signal. Further, the combination of the top AND gate and the top two D-Type Latches may check for frequency decreases of the CLOCK input signal. The combination of the bottom AND gate and the bottom two D-Type Latches may check for frequency increases of the CLOCK input signal.

The output latch may be a D-Type Latch and may be used to re-time the ERROR output to a known phase relative to the CLK_A 228 and CK_B 328 signals to ensure that when an error is detected, switchover occurs at a controlled time relative the rising edges of CLK_A signal 228 and CLK_B 328.

Figure 10:
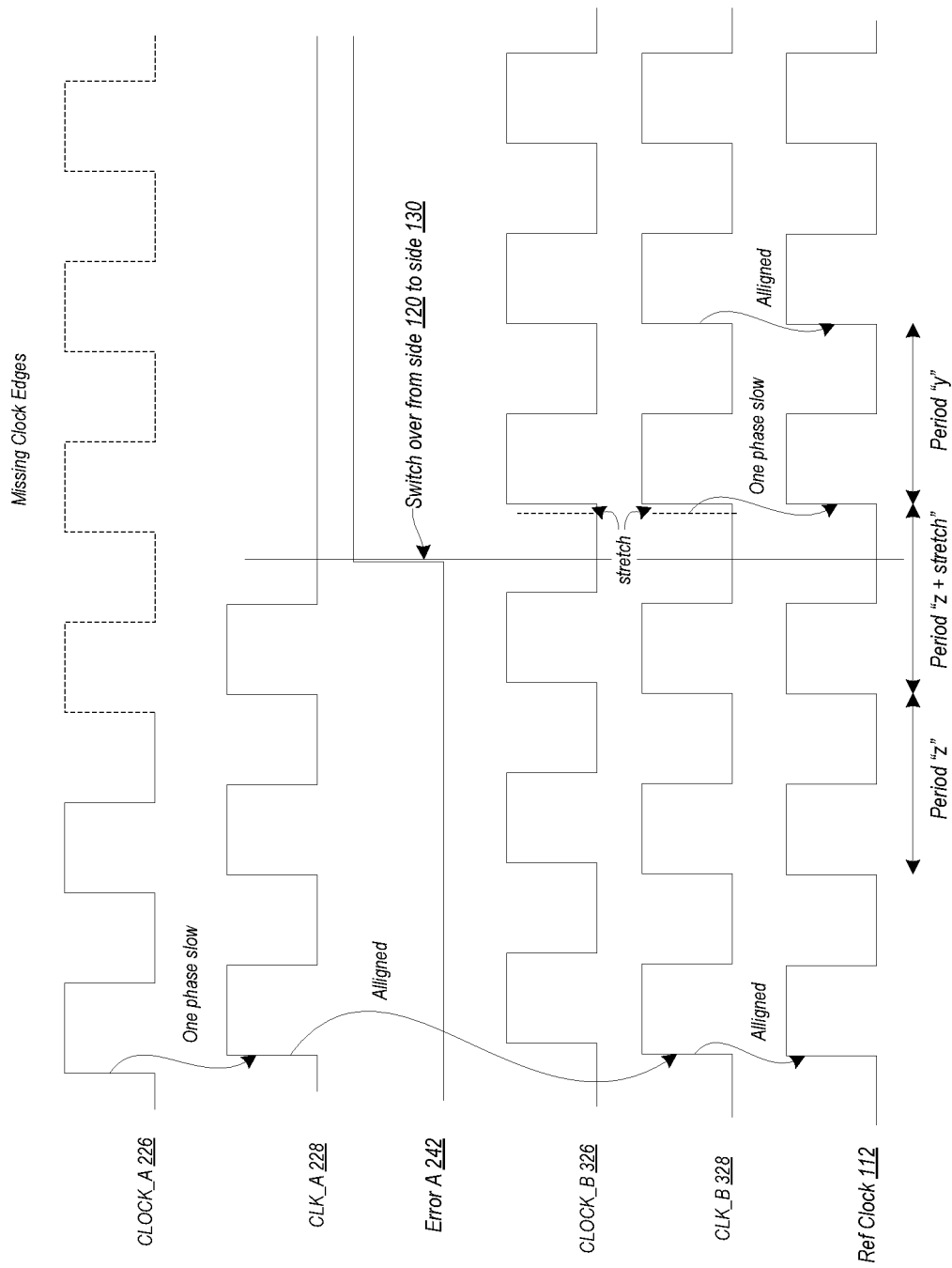
FIG. 10 is an exemplary timing diagram of the redundant clock switch, in accordance with one or more embodiments.

FIG. 10 is an exemplary timing diagram of RCS 110, in accordance with one or more embodiments. The depicted timing diagram depicts CLOCK_A signal 226, CLK_A signal 228, Error A signal 242, CLOCK_B signal 326, CLK_B signal 328, and the reference clock signal 112 prior to and subsequent to the switchover of side 130 becoming the primary side.

Initially, side 120 has been chosen as the primary side and side 130 is resultantly the secondary or redundant side. Phase rotator 220 generates various clock signals from clock input 82 each being offset from each other by a fixed phase. CLOCK_A signal 226 has the most similar or aligned phase relative to the phase of clock signal 82. CLK_A signal 228 is the clock that lags CLOCK_A signal 226 by a predetermined fixed phase or multiple thereof (e.g., $M*2^N$ phases).

Similarly, phase rotator 320 generates various clock signals from clock input 92 each being offset from each other by a fixed phase. CLOCK_B signal 326 has the most similar or aligned phase relative to the phase of clock signal 92. CLK_B signal 328 is the clock that lags CLOCK_B signal 326 by a predetermined fixed phase or multiple thereof (e.g., $M*2^N$ phases).

At a certain time, CLOCK_A signal 226 experiences a fault or error (e.g., missing pulses, stuck low, stuck high, or the like). As the CLOCK_A signal 226 is stored in the shift register of phase rotator 220 and is clocked by the PLL 210, the CLK_A signal 228 derived therefrom may run for M cycles after the error of CLOCK_A signal 226. The Error A 242 signal goes high, signaling the error of CLOCK_A signal 226 forcing switchover from side 120 to side 130. Switchover may occur prior to the next rising edge of CLK_A signal 228 or the next rising edge of CLK_B signal 328 since CLK_B signal 328 is aligned to CLK_A signal 228 by phase rotator 320.

The high or true Error A signal 242 may be used by the decoder of phase generator 550 within phase rotator 320 to advance the decoder's one-hot output code by one code. This code advancement may shift the phases of CLK_B signal 328 and CLOCK_B signal 326 to their respective next lagging phase, effectively stretching CLK_B signal 328, CLOCK_B signal 326, and the reference clock 112 by one phase for the cycle inclusive of the switchover. In the depicted example, prior to switchover, reference clock 112 signal is the CLK_A signal 228 and may have a period or cycle time of or about z (i.e., the period of CLK_A signal 228). Subsequent to switchover, for the cycle that which includes the switchover, reference clock 112 signal is the CLK_B signal 228 and may have a period or cycle time of or about z plus the stretch of one phase. Subsequent to this switchover cycle, reference clock 112 signal is the CLK_B signal 228 which may revert to its period or cycle time of or about y (i.e., the period of CLK_B signal 328).

Figure 11:
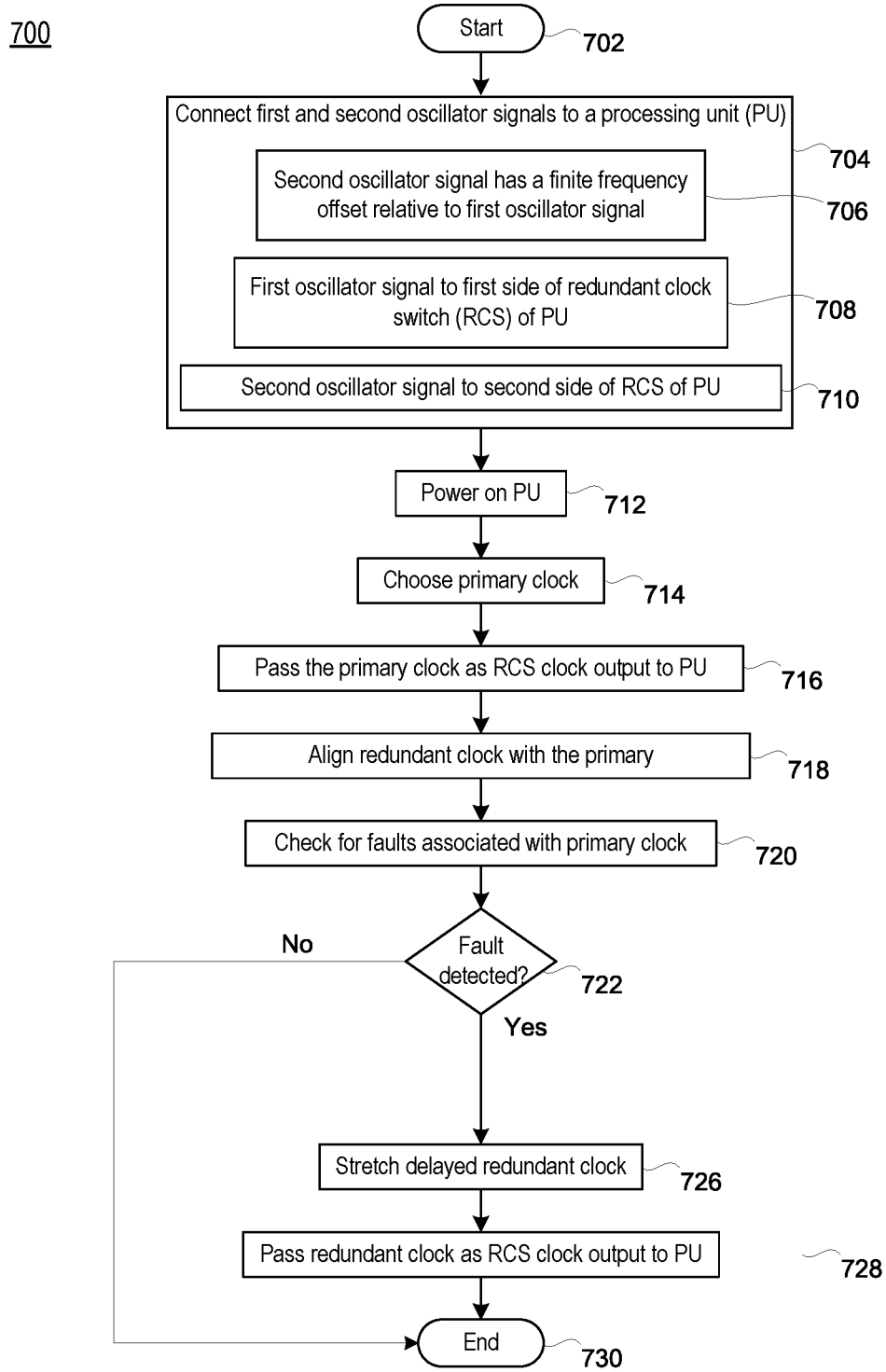
FIG. 11 is a block diagram illustrating a redundant clocking method, in accordance with one or more embodiments.

FIG. 11 is a block diagram illustrating redundant clocking method 700, in accordance with one or more embodiments. Method begins at block 702 and may continue with connecting first oscillator signal 82 from first oscillator 80 to processing unit 100 and with connecting second oscillator signal 92 from second oscillator 90 to processing unit 100. As the first oscillator 80 is discrete from second oscillator 90, the second oscillator signal 92 may have a finite frequency or phase offset relative to the first oscillator signal 82 (block 706). The first oscillator signal 82 may be connected to side 120 of RCS 110 within PU 100 (block 708) and the second oscillator signal 92 may be connected to side 130 of RCS 110 within PU 100 (block 710).

Method 700 may continue with initializing, bringing up, or otherwise powering the PU 100 (block 712) and choosing a primary clock (block 714).

The primary clock may be chosen by first detecting clocking within side 120 and/or within side 130. Clock detector 230, 330 may be utilized to determine whether side 120, 130 has switching clocks, respectively. The clock detector 230 may sample signal 82 and may generate an output Good_A signal 232 that is true upon when clocking (e.g. rising and falling edges) have been detected upon the signal 82. Similarly, clock detector 330 may sample signal 92 and may generate an output Good_B signal 332 that is true upon when clocking (e.g., rising and falling edges) has been detected upon the signal 92. Known or predetermined arbitration logic may be utilized to choose side 120 or side 130 as the primary side if both Good_A signal 232 and Good_B signal 332 are true. Side 120 may be chosen as the primary side if Good_A signal 232 is true and Good_B signal 332 is false. Alternatively, side 130 may be chosen as the primary side if Good_A signal 232 is false and Good_B signal 332 is true. The side 120, 130 that is not chosen as the primary side is effectively chosen as the secondary or redundant side.

The CLKOUT_SLOW signal from the phase rotator within the primary side may be chosen as the primary clock.

Method 700 may continue with passing the primary clock as the reference clock 112 output from RCS 110 to the PU 100 (block 716). For example, output multiplexer 410 may select the CLKOUT_SLOW signal from the phase rotator within the primary side as reference clock output 112. The reference clock output 112 may be utilized by the PU 100 to synchronize its internal circuit operations or functions.

Method 700 may continue with aligning a secondary or redundant clock to the primary clock (block 718). For example, the phase rotator within the secondary side rotates the phase of the CLKOUT_SLOW signal (i.e., the redundant clock) to effectively align the rising edges and/or the falling edges of the redundant clock to the rising edges and/or falling edges of primary clock, respectively. By aligning the secondary clock to the primary clock, phase, clocking delays, or glitches may be minimized or reduced upon switchover to the redundant clock.

Method 700 may continue with checking for or otherwise determining if a fault associated with the primary clock. For example, the fault may be lack of rising edges and/or falling edges of the primary clock, the primary clock being stuck high or stuck low, frequency increases or decreases, or the like.

Method 700 may continue with stretching the redundant clock by one phase for the clock cycle that is inclusive of switchover of the secondary side becoming the primary side, if a fault condition associated with the primary clock has been detected. For example, an error or fault indicator that indicates the fault of the primary clock may be utilized by the decoder of phase generator 550 within phase rotator in the secondary side to advance the decoder's one-hot output code by one code. This code advancement may shift the phase of the redundant clock to its next leading phase.

Method 700 may continue with passing the stretched redundant clock as the RCS 100 output to the PU 100. For example, output multiplexer 410 may select the stretched redundant clock as reference clock output 112.

The flowcharts and block diagrams in the Figures may illustrate the architecture, functionality, or operations of possible implementations of systems, methods, or devices according to various embodiments of the present invention. In this regard, each block in the flowchart or block diagrams may represent a module, segment, or portion of circuits or circuit systems. In some alternative implementations, the functions noted in the flowchart block may occur out of the order noted. For example, two blocks shown in succession may, in fact, be executed substantially concurrently, or the blocks may sometimes be executed in the reverse order, depending upon the functionality involved.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A redundant clock switch (RCS) clocking method comprising:
    deriving, with the RCS, a first clock signal from a first oscillator signal received by the RCS from a first oscillator;
    deriving, with the RCS, a second clock signal from a second oscillator signal received by the RCS from a second oscillator, the second oscillator signal comprising a frequency or phase offset relative to the first oscillator signal;
    selecting, with the RCS, the first clock signal as a reference clock output from the RCS; and
    aligning, with the RCS, the second clock signal to the first clock signal by determining widths of increment pulses and determining widths of decrement pulses, comparing the widths of increment pulses with the widths of decrement pulses, and based upon the comparison, rotating a phase of the second clock signal to align with a phase of the first clock signal.

2. The RCS clocking method of claim 1, further comprising:
    detecting, with the RCS, a fault to the first clock signal;
    upon detecting the fault to the first clock signal, stretching, with the RCS, the second clock signal by a lagging phase; and
    upon detecting the fault to the first clock signal, selecting, with the RCS, the second clock signal as the reference clock output from the RCS.

3. The RCS clocking method of claim 2, wherein the reference clock output comprises a stretched period for one clock cycle that includes switchover of the second clock being selected as the reference clock output.

4. The RCS clocking method of claim 1, wherein rotating the phase of the second clock signal to align with the phase of the first clock signal comprises:
    aligning rising edges of the second clock signal to rising edges of the first clock signal.

5. The RCS clocking method of claim 1, wherein deriving the first clock signal from the first oscillator signal comprises:
    creating N copies of the first oscillator signal;
    simultaneous shifting the N copies of the first oscillator signal by a fixed number of degrees to create N copies of the first oscillator signal each separated by a fixed phase;
    identifying a first delayed clock that lags the first oscillator signal by one fixed phase; and
    selecting the first delayed clock as the first clock signal.

6. The RCS clocking method of claim 2, wherein deriving the second clock signal from the first oscillator signal comprises:

creating N copies of the second oscillator signal;
simultaneous shifting the N copies of the second oscillator signal by a fixed number of degrees to create N copies of the second oscillator signal each separated by a fixed phase;
identifying a second delayed clock that lags the second oscillator signal by one fixed phase; and
selecting the second delayed clock as the second clock signal.

7. The RCS clocking method of claim 6, wherein upon detecting the fault to the first clock signal, stretching the second clock signal by the lagging phase comprises:
upon detecting the fault to the first clock signal, advancing the second clock signal by one fixed phase.

8. An electronic device comprising:
a first oscillator that generates a first oscillator signal;
a second oscillator that generates a second oscillator signal, the second oscillator signal comprising a frequency or phase offset relative to the first oscillator signal;
a redundant clock switch comprising a primary side communicatively connected to the first oscillator and a redundant side communicatively connected to the second oscillator;
a primary phase rotator within the primary side that derives a primary clock signal from the first oscillator signal;
a multiplexer that selects the primary clock signal as an output reference clock that clocks a processing unit;
a redundant phase rotator within the redundant side that derives a redundant clock signal from the second oscillator signal and aligns the redundant clock signal to the primary clock signal; and
a phase frequency detector that receives the primary clock and the redundant clock and outputs increment pulses and decrement pulses therefrom, wherein widths of the increment pulses are proportional to timing differences between leading rising edges of the primary clock and leading trailing edges of the redundant clock and wherein widths of the decrement pulses are proportional to timing differences between leading rising edges of the redundant clock and leading trailing edges of the primary clock.

9. The electronic device of claim 8, further comprising:
a primary error detector within the primary side that detects faults of the primary clock signal and sends a primary clock error signal to the redundant phase rotator.

10. The electronic device of claim 9, wherein the redundant phase rotator stretches the redundant clock signal by a lagging phase upon receipt of the primary clock error signal.

11. The electronic device of claim 10, wherein the multiplexer selects the second clock signal as the reference clock upon the redundant phase rotator receiving the primary clock error signal.

12. The electronic device of claim 11, wherein the reference clock comprises a stretched period for one clock cycle that includes switchover of the second clock being selected as the reference clock.

13. The electronic device of claim 8, wherein the redundant phase rotator compares widths of the increment pulses to widths of the decrement pulses and rotates a phase of the redundant clock signal to align rising edges of the redundant clock signal to rising edges of the primary clock signal.

14. The electronic device of claim 13, wherein the redundant rotator shifts N copies of the second oscillator signal by a fixed number of degrees to create N copies of the second oscillator signal each separated by a fixed phase, identifies a delayed clock that lags the second oscillator signal by one fixed phase, and selects the second delayed clock as the redundant clock signal.

15. The electronic device of claim 14, wherein the redundant phase rotator advances the second clock signal by one fixed phase in response to the receipt of the primary clock error signal.

16. A method comprising:
transmitting a first oscillator signal and second oscillator signal to a processing unit, the first oscillator signal comprising a finite frequency or phase offset relative to the second oscillator signal;
powering the processing unit;
selecting a first clock signal derived from the first oscillator signal as a primary clock to clock the processing unit;
aligning rising edges of a second clock signal derived from the second oscillator signal to rising edges of the first clock signal by determining widths of increment pulses and determining widths of decrement pulses, comparing the widths of increment pulses with the widths of decrement pulses, and based upon the comparison, rotating a phase of the second clock signal to align with a phase of the first clock signal;
checking for a fault on the first clock signal; and
if a fault is detected on the first clock signal, selecting the second clock signal as the primary clock to clock the processing unit.

17. The method of claim 16, further comprising:
if a fault is detected on the first clock signal, stretching the second clock signal by a lagging phase.

18. The method of claim 17, wherein the primary clock comprises a stretched period for one clock cycle that includes switchover of the second clock signal being selected as the primary clock.

19. The method of claim 16, wherein rotating the phase of the second clock signal to align with the phase of the first clock signal comprises:
aligning rising edges of the second clock signal to rising edges of the first clock signal.

* * * * *